(12) United States Patent
Akimoto

(10) Patent No.: US 6,168,166 B1
(45) Date of Patent: Jan. 2, 2001

(54) METAL GASKET WITH TWO HALF BEADS

(75) Inventor: Noriaki Akimoto, Tokyo (JP)

(73) Assignee: Ishikawa Gasket Co., Ltd., Tokyo (JP)

( * ) Notice: Under 35 U.S.C. 154(b), the term of this patent shall be extended for 0 days.

(21) Appl. No.: 09/317,254

(22) Filed: May 24, 1999

(30) Foreign Application Priority Data

May 29, 1998 (JP) .................................................. 10-148198

(51) Int. Cl.$^7$ .................................................. F02F 11/00
(52) U.S. Cl. .......................... 277/594; 277/593; 277/591
(58) Field of Search ..................... 277/591, 593, 277/594, 595

(56) References Cited

U.S. PATENT DOCUMENTS

| | | | |
|---|---|---|---|
| 4,312,512 | * | 1/1982 | Conte et al. . |
| 4,372,564 | * | 2/1983 | Nicholson . |
| 4,915,398 | * | 4/1990 | Kitagawa . |
| 5,022,664 | * | 6/1991 | Kitada et al. . |
| 5,078,413 | * | 1/1992 | Miyaoh . |
| 5,286,039 | * | 2/1994 | Kawaguchi et al. . |
| 5,316,322 | * | 5/1994 | Udagawa et al. . |
| 5,582,415 | | 12/1996 | Yoshida et al. . |
| 5,584,490 | * | 12/1996 | Inoue et al. . |
| 5,588,657 | * | 12/1996 | Fujisawa et al. . |
| 5,626,350 | * | 5/1997 | Kubouchi et al. . |
| 5,653,451 | | 8/1997 | Udagawa . |
| 5,711,537 | * | 1/1998 | Inamura et al. . |

FOREIGN PATENT DOCUMENTS 1 425 524   3/1969   (DE) .

* cited by examiner

Primary Examiner—Anthony Knight
Assistant Examiner—Vishal Patel
(74) Attorney, Agent, or Firm—Kanesaka & Takeuchi

(57) ABSTRACT

A metal gasket for an internal combustion engine is basically formed of a main plate. The main plate includes a first hole for constituting one of bolt holes, a second hole corresponding to a fluid hole and situated adjacent to the first hole, and a full bead having a first half bead and a second half bead situated outside the first half bead. The first half bead completely surrounds only the second hole, and the second half bead surrounds the first and second holes. Thus, a portion away from the first hole is surrounded by the first and second half beads to securely seal around the second hole. Also, the tightening pressure by the bolt can be supported with good balance.

6 Claims, 2 Drawing Sheets

METAL GASKET WITH TWO HALF BEADS

BACKGROUND OF THE INVENTION AND RELATED ART STATEMENT

The present invention relates to a metal gasket with two half beads for sealing a fluid hole situated close to a bolt hole, which is especially suitable for a cylinder head gasket.

In an internal combustion engine, a plurality of cylinder bores is arranged generally linearly, and various holes, such as bolt holes, water holes, oil holes and so on, are arranged around the cylinder bores. Since high temperature and pressure are formed in the cylinder bores, the bolt holes are arranged equally around the cylinder bores to securely and equally seal therearound. However, since the water holes and oil holes do not form extremely high pressure therein, the bolt holes are not arranged equally around these holes, and these holes are simply located near the cylinder bores.

Especially, the oil holes for transferring oil to valves or rotating portions are likely to be formed at the periphery of the engine outside the bolt holes. In this case, when a gasket is installed between a cylinder head and a cylinder block, and is tightened strongly by bolts, the oil holes are not sufficiently compressed, especially at a side opposite to the bolt hole. This is because the cylinder head and/or cylinder block is made of light metal or alloy, such as aluminum alloy, which does not have rigidity. Thus, even if the cylinder head is tightened strongly, the area outside the bolt hole is not compressed sufficiently, so that oil may leak through the oil hole.

In view of the above, U.S. Pat. No. 5,711,537 (Japanese Utility Model Publication (KOKOKU) No. 7-62358) was proposed, wherein a bolt hole and an oil hole are both surrounded by a bead. The spring constant of the bead at the bolt hole side is less than that at the oil hole side, and the middle portions between the bolt hole side and the oil hole side are gradually changed. In this gasket, since the spring constant of the bead is changed according to the unequal tightening force applied thereto, when the bead is compressed, the bead can provide generally equal surface pressure. However, since the spring constant of the bead is changed, it requires a precise processing and the manufacturing cost of the gasket becomes relatively high.

Also, in Japanese Utility Model Publication (KOKOKU) No. 6-45094, a gasket includes a projecting bead surrounding a main hole, and secondary holes, such as bolt hole and oil hole, are disposed in a wide area of the projecting bead to be surrounded by half beads. Since the gasket does not have a bead separating the oil hole from the bolt hole, the oil hole may not be sealed properly. In addition, since the full or half bead surrounding the hole forms a single sealing line, the surface pressure for the bead outside the oil hole becomes weak. Thus, the sufficient sealing can not be made to cause an oil leakage.

In U.S. Pat. No. 5,653,451, an oil bole situated near a bolt hole is surrounded by a sealing bead and a supporting bead. The supporting bead is deviated from the fluid hole to balance the surface pressure around the fluid hole.

Various attempts have been made to solve the problems, but it is still required to improve the sealing ability around the fluid hole near the bolt hole.

In view of the above, the present invention has been made, and an object of the invention is to provide a metal gasket, which can securely seal around a fluid hole near a bolt hole.

Another object of the invention is to provide a metal gasket as stated above, wherein portions to which different tightening pressures are applied when the gasket is tightened are sealed by different beads.

A further object of the invention is to provide a metal gasket as stated above, which can be formed easily and economically.

Further objects and advantages of the invention will be apparent from the following description of the invention.

SUMMARY OF THE INVENTION

A metal gasket of the invention is used for an internal combustion engine having bolt holes and a fluid hole to be sealed. Especially, the gasket is suitable to seal a fluid hole, such as oil hole, located near the bolt hole, to which a sufficient tightening pressure is not applied.

The metal gasket is formed of a main plate for forming the metal gasket, and includes a first hole for constituting one of the bolt holes, a second hole corresponding to the fluid hole and situated adjacent to the first hole, and a full or continuous bead surrounding the first and second holes. The bead includes a first half bead, and a second half bead situated outside the first half bead. The first or inner half bead completely surrounds only the second hole, and the second or outer half bead surrounds the first and second holes. A portion away from the first hole is surrounded by the first and second half beads to securely seal around the second hole, and the first half bead is located between the first and second holes.

In the invention, since the portion around the second hole located away from the first hole has the full bead or first and second half beads, when the gasket is tightened, the full bead can provide sufficient surface pressure thereat. Also, since the first half bead fully surrounds the second hole, the seal around the second hole including the portion between the first and second holes can be made securely. Further, since the second half bead surrounds the first hole together with the second hole, the first hole can be securely sealed. Accordingly, the first and second holes can be secure sealed by the first and second half beads.

In the invention, the gasket may further include a peripheral bead extending around an outer periphery of the gasket. A part of the full bead is located between the peripheral bead and the second hole. Preferably, the peripheral bead is a half bead formed on the main plate. In this case, even if a space between the second hole and the edge of the main plate is narrow, the full bead and the peripheral bead can be formed in the narrow space.

The full bead has the width between the first and second half beads. A first width located at a side away from the first hole is substantially constant, and a second width located at a portion other than the first width is greater than the first width.

DETAILED DESCRIPTION OF PREFERRED EMBODIMENT

An embodiment of the invention will be explained with reference to the accompanying drawings.

Figure 1:
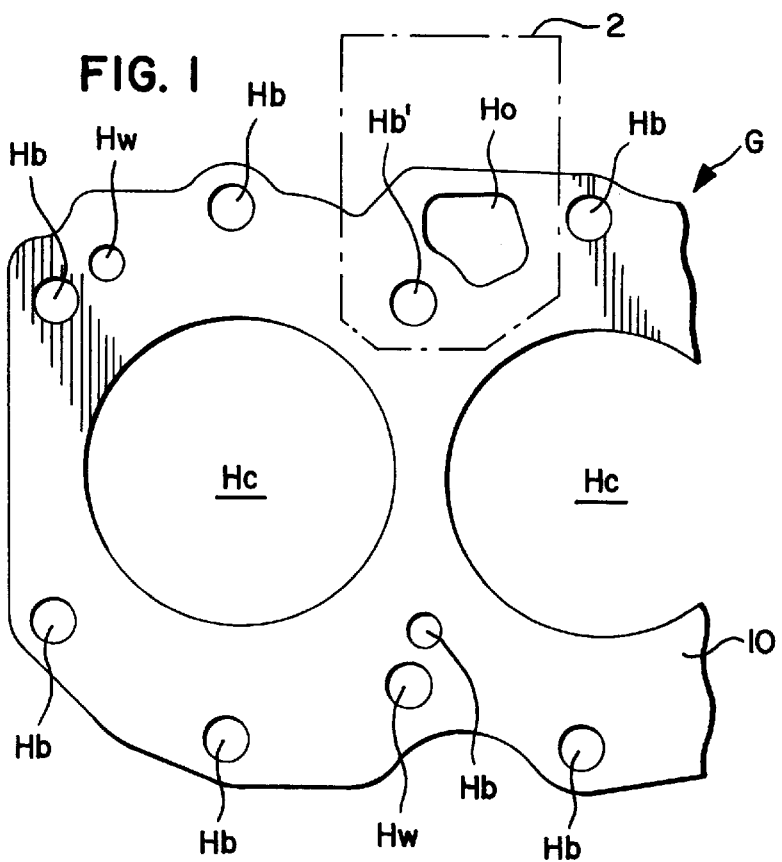
FIG. 1 is a partial plan view of a cylinder head gasket of the invention.

FIG. 1 is a cylinder head gasket G to be situated between a cylinder block and a cylinder head (both not shown). The gasket G includes a plurality of cylinder bores Hc, bolt holes Hb, Hb' surrounding the cylinder bores Hc, oil holes Hw and so on, as in the conventional gasket. The oil hole Ho is located near the bolt hole Hb', and the oil hole and the bolt hole are sealed in accordance with the invention. The sealing mechanism for the oil hole Ho and the bolt hole Hb' are explained hereinafter. The rest of the structure of the gasket is not explained, but any structure can be employed in the gasket.

The gasket G is formed of an upper plate 10, a middle plate 11 and a lower plate 12, which have substantially the same sizes. The upper and lower plates 10, 12 are plain plates and sandwich the middle plate 11 therebetween.

The middle plate 11 includes a peripheral half bead 11a extending along a periphery of the gasket G. The peripheral portion of the plate 11 outside the peripheral half bead 11a is located at an upper side, which contacts the upper plate 10 when the gasket G is assembled.

The middle plate 11 further includes a bead 13 formed of an inner half bead 13a and an outer half bead 13b. The half beads 13a, 13b surround an outer portion of the oil hole Ho away from the bolt hole Hb', so that the outer portion is sealed by the full bead. The inner half bead 13a completely surrounds the oil hole Ho, while the outer half bead 13b surrounds the oil hole Ho and the bolt hole Hb'.

An inner portion of the middle plate 11 inside the inner half bead 13a is located at a lower side. A portion of the bead 13 between the inner and outer half beads 13a, 13b is located at an upper side, same as the peripheral portion of the plate 11. A portion between the outer half bead 13b and the peripheral half bead 11a is located at a lower side.

In regard to the sealing of the oil hole Ho, a portion near the bolt hole Hb' where a relatively large tightening pressure is applied can be sealed by the inner half bead 13a, while a portion away from the bolt hole Hb' is sealed by the inner and outer half beads 13a, 13b. A portion around the bolt hole Hb' at a side opposite to the oil hole Ho is surrounded by the outer bead 13b. Thus, even if oil flows through the inner half bead 13a, the outer half bead 13b can seal the oil flowing through the inner half bead 13a. Also, the outer bead 13b operates to regulate and support the pressure applied to the bolt hole Hb' and the oil hole Ho.

Also, since the middle plate 11 includes the peripheral half bead 11a outside the oil hole Ho, the portion outside the full bead 13 can be securely sealed.

In case a space between the oil hole Ho and the outer edge of the middle plate is narrow, such as 7 mm, it is difficult to form two full beads. However, in the invention, the full bead and the peripheral half bead can be formed to thereby securely seal at the portion where the tightening pressure is weak.

In regard to sealing of the bolt hole Hb', since the outer half bead 13b and the peripheral half bead 11a are formed outside the bolt hole Hb', the sealing can be made securely.

In the gasket G, since the plural sealing lines formed by the half beads are formed around the oil hole Ho and the bolt hole Hb', the tightening pressure is not concentrated in one portion. Therefore, even if the cylinder head and/or cylinder block is formed of light metal, which is deformed easily, the cylinder head and/or cylinder block is not damaged by the tightening pressure. Incidentally, since the edge portion of the gasket away from the bolt hole Hb' does not receive high tightening pressure, the portion of the cylinder head and/or cylinder block on which the full bead 13 and the peripheral half bead 11a are located is not damaged by the tightening pressure.

In the gasket G, the peripheral bead 11a is formed in the middle plate 11. However, the peripheral bead may be formed in the upper or lower plate. Also, the gasket may be formed of a middle plate only, or a combination of the middle plate and upper or lower plate.

In the invention, the fluid hole adjacent to the bolt hole is completely surrounded by the inner half bead, and the fluid hole and bolt holes are completely surrounded by the outer half bead. Thus, the portion where the tightening pressure is weak is surrounded by the inner and outer half beads, and the portions where the relatively high tightening pressure is applied are surrounded by the half bead. Thus, the fluid hole and the bolt hole can be securely sealed by the combination of the half beads.

While the invention has been explained with reference to the specific embodiment of the invention, the explanation is illustrative and the invention is limited only by the appended claims.

What is claimed is:

1. A metal gasket for an internal combustion engine having bolt holes and a fluid hole to be sealed, comprising:

a main plate for forming the metal gasket, a first hole for constituting one of the bolt holes, a second hole corresponding to the fluid hole and situated adjacent to the first hole, and a full bead having a first half bead and a second half bead situated outside the first half bead, said first half bead completely surrounding only the second hole and said second half bead surrounding the first and second holes so that a portion away from the first hole is surrounded by the first and second half beads to securely seal around the second hole.

2. A metal gasket according to claim 1, further comprising a peripheral bead extending around an outer periphery of the gasket, a part of said full bead being located between the peripheral bead and the second hole.

3. A metal gasket according to claim 2, wherein said peripheral bead is a half bead formed in the main plate.

4. A metal gasket according to claim 1, wherein said full bead has first and second widths between the first and second half beads, said first width being located at a side away from the first hole and said second width being located at a portion other than the first width, said first width being substantially constant and less than the second width.

5. A metal gasket according to claim 4, wherein said second hole is located substantially between the first hole and an outer periphery of the gasket.

6. A metal gasket according to claim 5, further comprising upper and lower plates disposed above and below the main plate, respectively, to constitute a metal laminate gasket.

* * * * *

UNITED STATES PATENT AND TRADEMARK OFFICE
CERTIFICATE OF CORRECTION

PATENT NO. : 6,168,166 B1
DATED : January 2, 2001
INVENTOR(S) : Noriaki Akimoto

Figure 5:
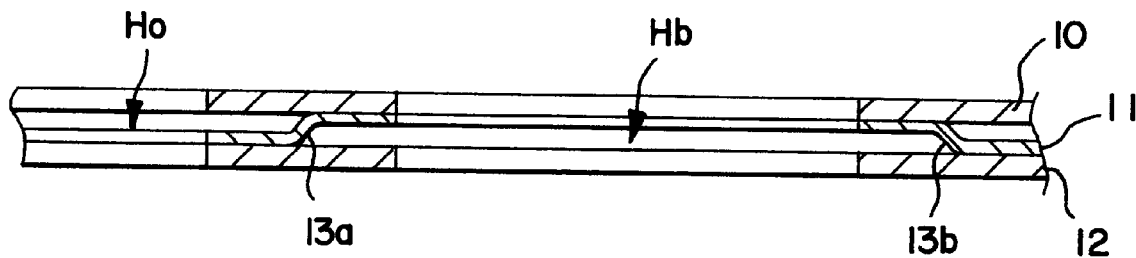
FIG. 5 is an enlarged sectional view taken along line 5—5 in FIG. 5.
Figure 5:
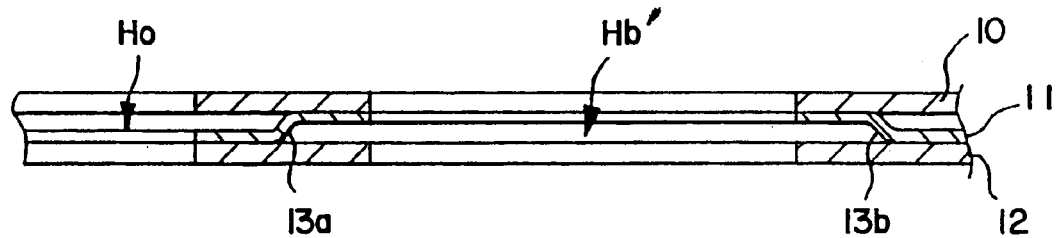

It is certified that error appears in the above-identified patent and that said Letters Patent is hereby corrected as shown below:

Drawings,
FIG. 5, change "Hb" to -- Hb´ -- as per attached drawing.

Figure 2:
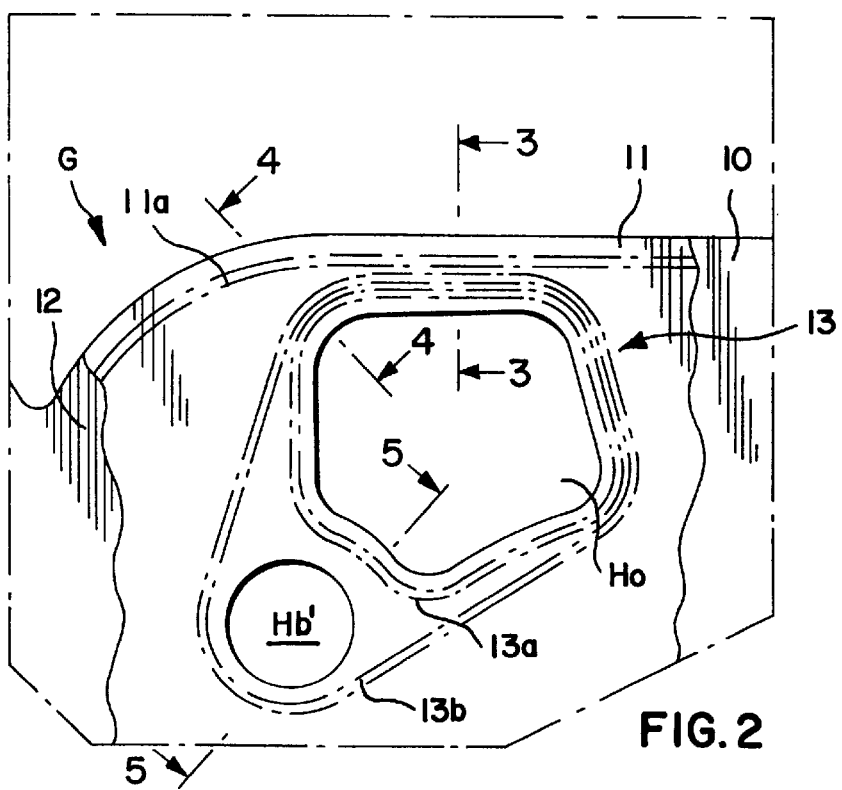
FIG. 2 is a partially cut enlarged plan view of a portion 2 shown in FIG. 1.
Figure 3:
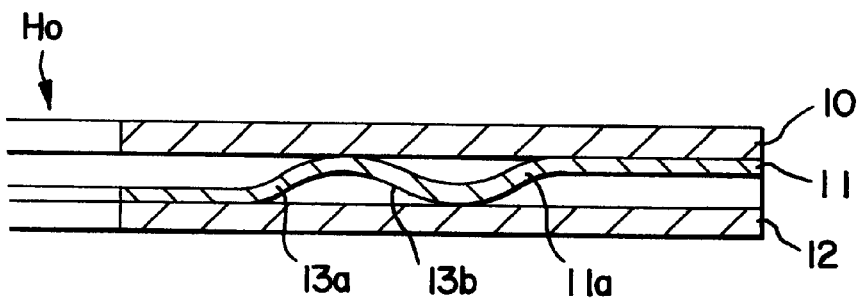
FIG. 3 is an enlarged sectional view taken along line 3—3 in FIG. 2.
Figure 4:
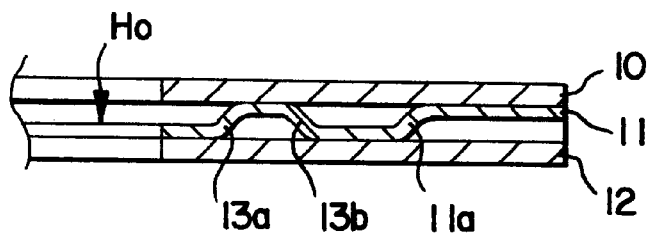
FIG. 4 is an enlarged sectional view taken along line 4—4 in FIG. 2.

Column 1,
Line 55, change "bole" to -- hole --;

Column 2,
Line 36, change "secure" to -- securely --;
Line 62, change "in FIG. 5." to -- in FIG. 2. --;

Column 3,
Line 4, change "Hw" to -- Ho --;
Line 8, change "are" to -- is --; and
Line 41, after "outer" add -- half --.

Signed and Sealed this

Fourth Day of February, 2003

JAMES E. ROGAN
*Director of the United States Patent and Trademark Office*